United States Patent [19]

Hill

[11] 4,103,955
[45] Aug. 1, 1978

[54] LOG CINCH

[76] Inventor: Louis F. Hill, 555 Walnut St., Lebanon, Oreg. 97355

[21] Appl. No.: 747,692

[22] Filed: Dec. 6, 1976

[51] Int. Cl.² ............................................. B25B 11/00
[52] U.S. Cl. .................................. 294/92; 294/78 R; 295/4
[58] Field of Search .................... 294/92, 4, 26, 78 R, 294/90, 91; 214/3; 24/294 R

[56] References Cited

U.S. PATENT DOCUMENTS

| | | | |
|---|---|---|---|
| 303,408 | 8/1884 | Wheeler | 294/92 |
| 524,595 | 8/1894 | Kaime et al. | 294/4 |
| 2,854,280 | 9/1958 | Wilkerson | 294/78 R |
| 3,708,196 | 1/1973 | Snell | 294/92 |

Primary Examiner—James B. Marbert
Attorney, Agent, or Firm—Eugene M. Eckelman

[57] ABSTRACT

An elliptical body member formed of a curved bar has an intermediate portion and end portions and has a cut-out therein forming a transverse opening so that the body member can be moved down over a log while disposed crosswise thereto. The intermediate portion and one of the end portions of the body member are substantially in straight line alignment with each other but the other end portion of the body member is curved forwardly in a spiral relation. The body member at the curved end portion has an integral eye thereon to which a pulling line can be connected. Since the eye for the connecting line is at the curved end, the body member will be positioned obliquely relative to the log and bind itself thereon. A rearwardly extending barb is provided on the other end of the body member and penetrates the log when the body member extends in oblique relation to the log. The body member has a gripping handle at approximately the center of gravity between the ends for manual manipulation.

3 Claims, 7 Drawing Figures

U.S. Patent     Aug. 1, 1978     4,103,955

LOG CINCH

BACKGROUND OF THE INVENTION

This invention relates to new and useful improvements in gripping devices and particularly pertains to a cinch especially adaptable for connection to logs for pulling the logs longitudinally.

Various chokers or gripping devices have heretofore been provided for connection to logs to be pulled by horses or by skidding or yarding devices. Such prior chokers require considerable time and effort for applying them to the log particularly since they are heavy and unwieldy as a result mostly from constructions which seek to provide a versatility capable of engaging substantially many different sizes of logs. Also, prior chokers have the disadvantage that they must circle a log in order to have a good connection thereto which of course makes them difficult to apply to logs lying on the ground.

SUMMARY OF THE INVENTION

According to the present invention and forming a primary objective thereof, a log cinch is provided which overcomes disadvantages of prior devices intended for the same purpose, particularly as applied to logging for smaller logs.

In accomplishing objectives of the invention, an elliptical body member has a cut-out portion forming a transverse opening into the body member so that the latter can be moved down over a log and arranged to grip the log when a forward pulling force is applied adjacent one end. The end to which the pulling force is applied is curved in spiral relation in a forward direction, and the opposite end of the body member has a barb arranged to penetrate the log when a pulling force is applied at the pulling end. Handle means are provided at approximately the center of gravity between the ends so that an operator can conveniently move the body member down over a log.

The invention will be better understood and additional objects and advantages will become more apparent from the following description taken in connection with the accompanying drawings.

DETAILED DESCRIPTION OF A PREFERRED EMBODIMENT

Figure 1:
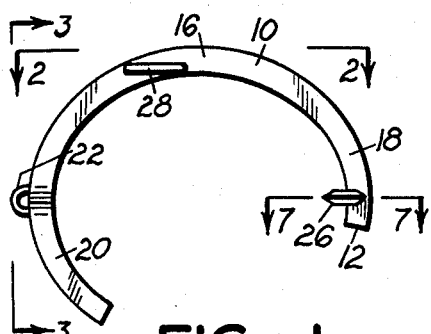
FIG. 1 is a front elevational view of the present log cinch.
Figure 7:
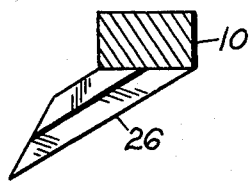
FIG. 7 is an enlarged sectional view taken on the line 7—7 of FIG. 1.
Figure 6:
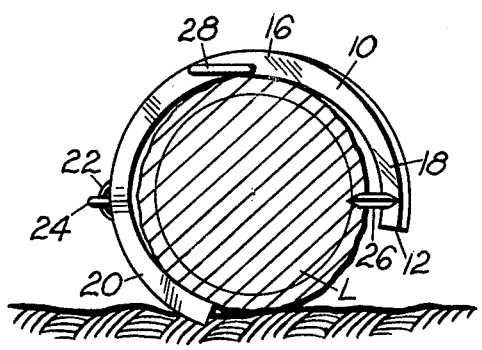
FIG. 6 is a front elevational view thereof as applied on a log and taken on the line 6—6 of FIG. 5.

With particular reference to the drawings, the present log cinch includes a body member 10 constructed of suitable rigid stock such as steel or the like. The body member 10 is bar-like in construction and may be rectangular in cross section as shown in FIG. 7 or it may be other suitable cross sectional configurations. As viewed from the front, FIGS. 1 and 6, the body member has an elliptical shape and has a cut-out portion 12 forming a transverse opening into the body member. This opening is of a size sufficient to allow the body member to be moved down over a log while crosswise to a log, as will be more apparent hereinafter.

Figure 2:
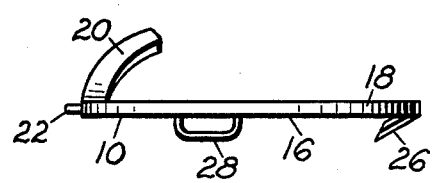
FIG. 2 is a top plan view taken on the line 2—2 of FIG. 1.
Figure 3:
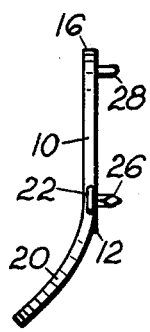
FIG. 3 is an edge view taken on the line 3—3 of FIG. 1.
Figure 4:
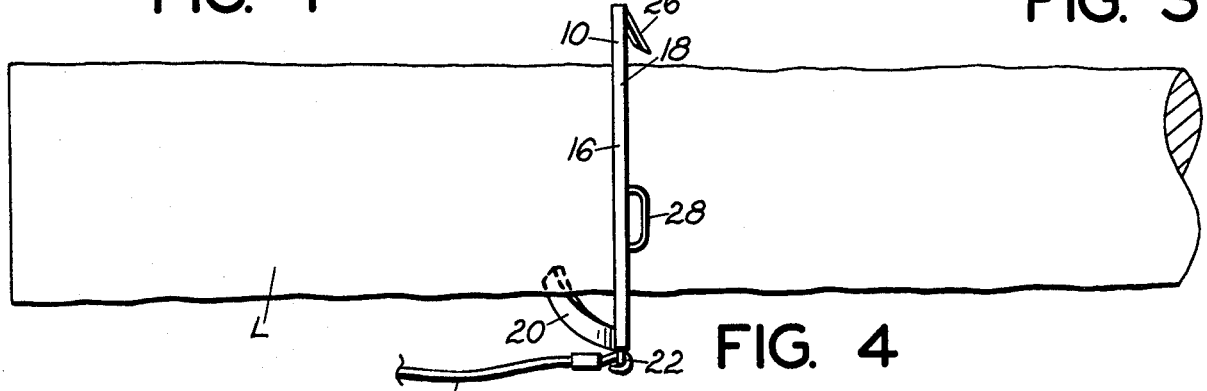
FIG. 4 is a top view of the present log cinch applied to a log in an initially installed position.
Figure 5:
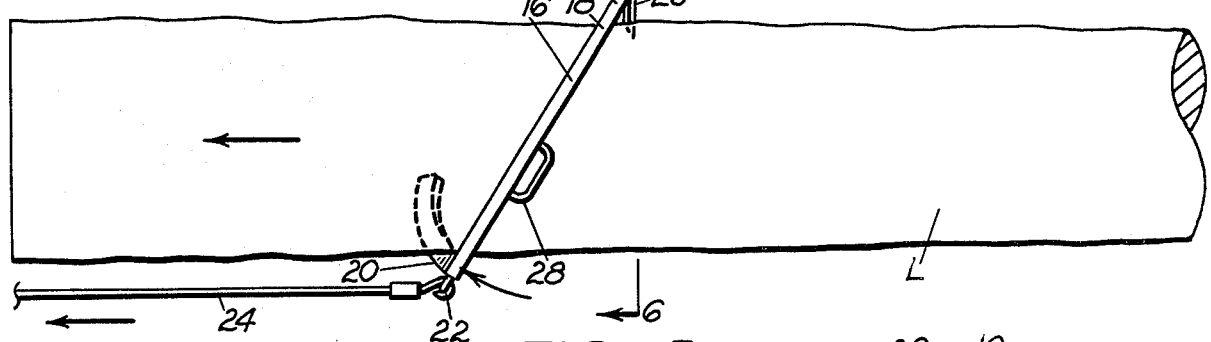
FIG. 5 is a top plan view of the log cinch the same as FIG. 4 but showing the cinch in binding relation on a log.

With particular reference to FIGS. 2, 4 and 5, an intermediate portion 16 of the body member is substantially straight when viewed edgewise and is in straight alignment with one end portion 18 which is also substantially straight. The other end portion 20, however, leads from the intermediate portion in a forward spiral relation, the forward direction comprising the direction in which pull is to be applied to the cinch, namely, to the left in FIGS. 4 and 5. Secured to the body member at about the junction between portions 16 and 20 is an eye 22 to which a pulling line 24 may be attached. This eye is on the outer edge of the body member.

Secured to the end portion 18 of the body member spaced back from opening 12 only a short distance is a rearwardly extending barb 26, best seen in FIG. 7, or other sharpened projection adapted to penetrate the log when a forward pulling force is applied on the eye 22, as will be more apparent hereinafter. Body member 10 has a handle 28 intermediate its ends for manual handling of the cinch. This handle is located at approximately the center of gravity of the cinch between the two ends whereby the cinch will be substantially balanced in a workman's hand when lifted by the handle. Since the cinch is balanced on opposite sides of the handle, a workman can readily manipulate the cinch by a single hand.

In the operation of the present cinch, the workman merely lifts the cinch upwardly an amount to clear the log L and since the opening 12 will automatically face down when the cinch is lifted by the handle, it is merely necessary for the workman to position the cinch crosswise over the log and drop it. The dimensions of the cinch are of course predetermined for adequate connection to the log, and for this purpose it has sufficient dimension in relation to the logs on which it is to be used such that the ends which define the opening 12 will be disposed below the axis of the log. This is shown particularly in FIG. 6. In fact, a preferred structural arrangement is to provide a substantially equal measurement relation of the minor axis of the body member and the size of the opening whereby, if the opening allows the cinch to be moved transversely down over a log, it will automatically have good connecton with the log. Such dimensional relationship just mentioned also provides full utilization of the device with minimum use of metal.

With the cinch mounted in engagement on a log, as shown in FIG. 4, the pull line 24 is attached to eye 22. Upon forward pulling of the pull line from a horse, skidding or other yarding device, the body member will twist on the log to assume an oblique position as shown in FIG. 5. Such twisting movement binds the cinch frictionally on the log, and such twisting movement also drives the barb 26 into the log to increase the holding function. The particular wrap-around engagement with a log resulting from the particular structural arrangement of the cinch and the manner in which it engages a log provides a positive pulling connection. The pull on the log does not have to be parallel with the axis of the log and thus the log cinch will maintain its connection to the log even though the log is pulled around corners or up and down inclines. To remove the cinch from a log, it is merely necessary to disconnect or slacken the pulling line and then manually pull the top of the body member back to turn it to the original right angular position at which it was applied as shown in FIG. 4, and then lift it vertically from the log.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A log cinch comprising
   (a) a body member,
   (b) said body member consisting of a bar curved to define a central area,
   (c) said body member having an intermediate portion and having opposite end portions terminating in end edges spaced from each other in a cut-out portion forming a transverse opening,
   (d) said end portions being spaced from each other an amount sufficient to form an opening large enough to receive a log such that the body member when positioned crosswise over a log can be moved down to receive the log through said opening,
   (e) said intermediate portion and one of said end portions of said body member being substantially straight and in straight line alignment with each other and the other end portion of said body member being curved in oblique relation in a forward direction,
   (f) line connecting means on said body member adjacent said other end portion to which a pulling line is arranged to be secured whereby upon a forward pull being applied to said body member at said line connecting means, said body member is moved obliquely of the log to have a binding connection thereto,
   and a rearwardly extending barb on said other end portion of said body member arranged to penetrate into a log for gripping engagement with the log when the body member extends obliquely relative to the log.

2. The log cinch of claim 1 including a lifting handle secured on said body member at approximately the center of gravity between the two ends.

3. The log cinch of claim 1 wherein the curvature of said body member is elliptical, the minor axis of said ellipse being substantially equal to the space between said disconnected end portions.

* * * * *